US011208542B2

(12) United States Patent
Mazzocchia et al.

(10) Patent No.: US 11,208,542 B2
(45) Date of Patent: Dec. 28, 2021

(54) TYRE FOR VEHICLE WHEELS

(71) Applicants: PIRELLI TYRE S.p.A, Milan (IT); POLITECNICO DI MILANO, Milan (IT)

(72) Inventors: Carlo Vittorio Mazzocchia, Milan (IT); Matteo Antonio Daghetta, Milan (IT); Lorenzo Pellegrino, Milan (IT); Attillio Citterio, Milan (IT); Enrico Albizzati, Milan (IT); Luca Giannini, Milan (IT); Thomas Hanel, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 264 days.

(21) Appl. No.: 16/467,190

(22) PCT Filed: Dec. 12, 2017

(86) PCT No.: PCT/IB2017/057841
§ 371 (c)(1),
(2) Date: Jun. 6, 2019

(87) PCT Pub. No.: WO2016/109661
PCT Pub. Date: Jun. 21, 2016

(65) Prior Publication Data
US 2020/0062933 A1 Feb. 27, 2020

(30) Foreign Application Priority Data
Dec. 13, 2016 (IT) .................. 102016000125806

(51) Int. Cl.
*C01B 32/162* (2017.01)
*B01J 23/745* (2006.01)
*B01J 37/04* (2006.01)
*B01J 37/08* (2006.01)
*C08L 9/00* (2006.01)
*B01J 37/02* (2006.01)
*B01J 37/03* (2006.01)
*B60C 1/00* (2006.01)

(52) U.S. Cl.
CPC .............. *C08L 9/00* (2013.01); *B01J 23/745* (2013.01); *B01J 37/0236* (2013.01); *B01J 37/036* (2013.01); *B01J 37/04* (2013.01); *B01J 37/08* (2013.01); *B60C 1/0016* (2013.01); *B60C 1/0025* (2013.01); *C01B 32/162* (2017.08); *C08L 2205/025* (2013.01); *C08L 2312/00* (2013.01)

(58) Field of Classification Search
CPC ... C01B 32/162; B60C 1/0016; B60C 1/0025; B01J 23/745; B01J 37/0236; B01J 37/036; B01J 37/04; B01J 37/08
USPC ........................................................ 423/138
See application file for complete search history.

(56) References Cited

U.S. PATENT DOCUMENTS

| 7,923,615 | B2 | 4/2011 | Silvy et al. |
| 8,398,949 | B2 | 3/2013 | Meyer et al. |
| 2001/0014307 | A1 | 8/2001 | Moy et al. |
| 2015/0298974 | A1 | 10/2015 | Kim et al. |

FOREIGN PATENT DOCUMENTS

| CN | 1363425 A | | 8/2002 |
| CN | 105964268 A | * | 9/2016 |
| CN | 105964268 A | | 9/2016 |
| DE | 10 2007 056 689 A1 | | 5/2009 |
| EP | 0 658 452 A1 | | 6/1995 |
| EP | 1 797 950 A1 | | 6/2007 |
| EP | 2 213 369 A1 | | 8/2010 |
| EP | 2 223 743 A1 | | 9/2010 |
| EP | 2 338 697 A1 | | 6/2011 |
| EP | 2 543 632 A1 | | 1/2013 |
| RU | 2575935 C2 | | 2/2016 |
| WO | WO 03/060002 A1 | | 7/2003 |
| WO | WO 2004/096704 A2 | | 11/2004 |
| WO | WO 2007/033438 A1 | | 3/2007 |
| WO | WO 2007/093337 A2 | | 8/2007 |
| WO | WO 2013/105779 A1 | | 7/2013 |

OTHER PUBLICATIONS

International Search Report form the European Patent Office in corresponding International Application No. PCT/IB2017/057841 dated May 2, 2018.
Written Opinion of the International Searching Authority from the European Patent Office in corresponding International Application No. PCT/IB2017/057841 dated May 2, 2018.
Bokobza, L., et al. "On the use of carbon nanotubes as reinforcing fillers for elastomeric materials", Society of Chemical Industry, Polymer International, vol. 55, No. 8, (2016), pp. 1090-0198.
First Office Action dated Mar. 26, 2021, from the China National Intellectual Property Administration, in counterpart Chinese Application No. 201780076949.1.
First Office Action dated Aug. 20, 2021, from the Russian Federal Service on Intellectual Property, in counterpart Russian Application No. 2019121026.
Russian Search Report from the Russian Federal Service on Intellectual Property in corresponding Russian Application No. 2019121026 dated Aug. 19, 2021.
Second Office Action from the China National Intellectual Property Administration, in counterpart Chinese Application No. 201780076949.1 dated Aug. 26, 2021.

* cited by examiner

*Primary Examiner* — Kelechi C Egwim
(74) *Attorney, Agent, or Firm* — Finnegan, Henderson, Farabow, Garrett & Dunner, L.L.P.

(57) ABSTRACT

The present invention relates to a tyre for vehicle wheels comprising at least one structural element comprising a cross-linked elastomeric material obtained by cross-linking a cross-linkable elastomeric composition comprising carbon nanotubes, wherein said carbon nanotubes are obtained with an iron oxides and/or aluminium oxides based catalyst substantially free of Co, Ni and Mo.

5 Claims, 4 Drawing Sheets

TYRE FOR VEHICLE WHEELS

Figure 1:
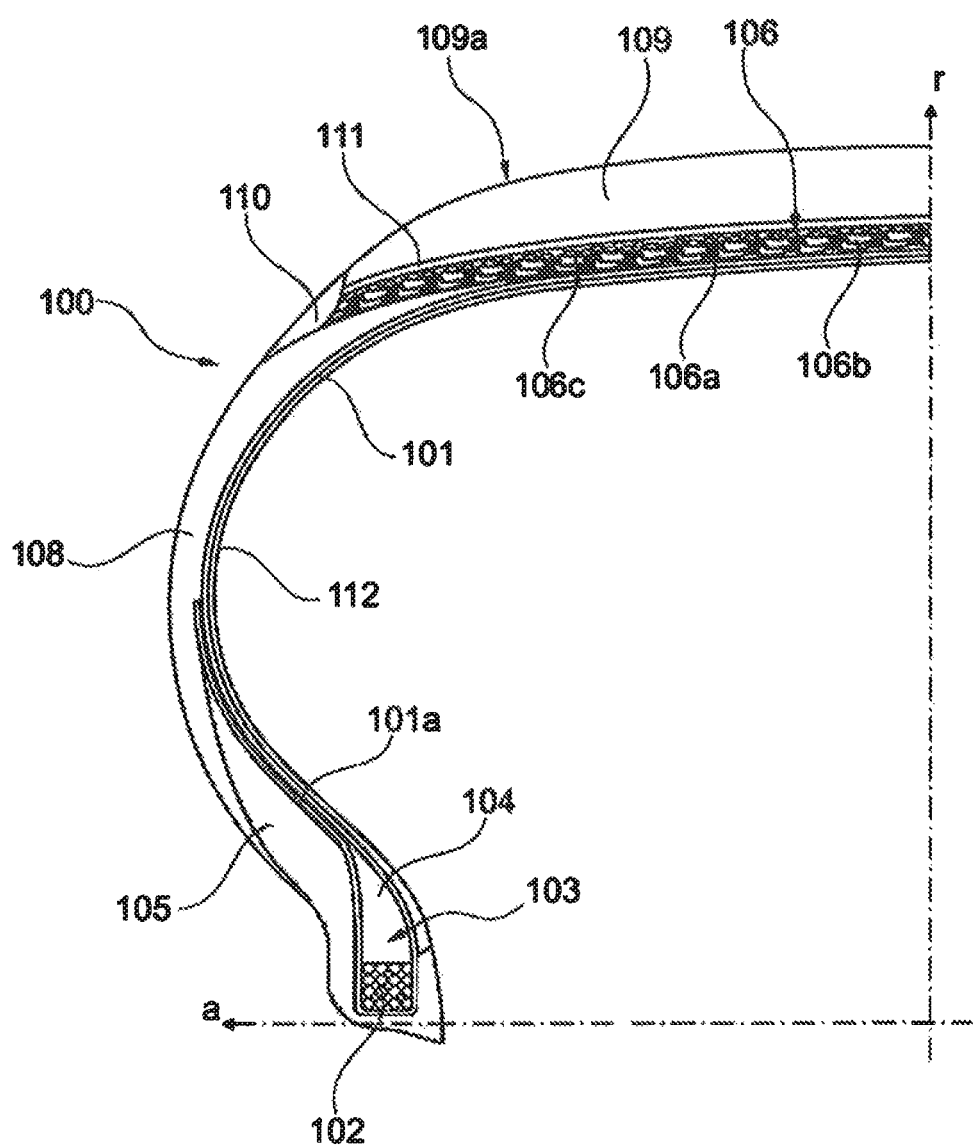

This application is a national phase entry application under 35 U.S.C. § 371 based on International Application No. PCT/162017/057841, filed Dec. 12, 2017, and claims priority of Italian Patent Application No. 102016000125806, filed Dec. 13, 2016; the contents of each application is incorporated herein by reference.

FIELD OF THE INVENTION

The present invention relates to a tyre for vehicle wheels. More particularly the present invention refers to a tyre comprising at least one structural element obtained by cross-linking a cross-linkable elastomeric composition comprising carbon nanotubes obtained with iron oxides and/or aluminium oxides based catalysts substantially free of Co, Ni and Mo.

PRIOR ART

In the rubber industry, in particular in the production of tyres, it is typical to use elastomeric compositions in which reinforcement fillers have been incorporated in the elastomeric polymer base, in order to improve the characteristics of the obtained cross-linked products, in particular the mechanical properties.

Due to its high reinforcement efficiency, carbon black is a particularly useful reinforcement filler. Carbon black nevertheless represents a non-renewable raw material, mainly deriving from partial processes of combustion of fossil fuels, mainly naphtha or other derivatives of oil, methane gas and other hydrocarbons. In addition, carbon black can be an environmental concern as it is a potential pollutant if not properly disposed of.

Many elastomeric compositions with which the structural elements of the tyre are currently produced, in particular the external elements such as treads and sidewalls, are made by incorporating silica-based reinforcement fillers. The silica-based reinforcement fillers allow obtaining various advantages in terms of low rolling resistance, of travel on wet or snowy surface, of resistance to wear.

In today's tyres, the partial substitution of the carbon black with silica-based reinforcement fillers has given rise to a static electricity accumulation phenomenon on the vehicle equipped with such tyres, since the silica-based reinforcement fillers, contrary to carbon black, are not conductive, and therefore do not allow the discharge to earth the static electricity generated by the rolling of the wheels and by the consequent movement of the vehicle.

For the purpose of overcoming such drawback, tyre manufacturers have made tyres comprising a conductive strip, made with mixtures comprising carbon black or other conductive materials, immersed in the tread structures and/or sidewalls, for the purpose of attaining the suitable grounding of the vehicle.

Embodiments of such tyres are described in EP658452 on behalf of the same Applicant. The manufacturing of such conductive strip involves several drawbacks.

From the production standpoint, the attainment of such strip requires the use of an additional passage and of a more complex apparatus in the extrusion of the mixture which will come to form the tread of the tyre.

In the art, it has also been proposed to make the entire tread with a mixture admixed with carbon nanotubes, in order to restore the correct conductivity of the tyre.

Embodiments of such tyres and/or of mixtures for components of tyres containing carbon nanotubes are described in EP2338697, DE10/2007/056689, and WO03/060002.

The carbon nanotubes are prepared by making a gaseous compound containing carbon, typically methane, ethylene or acetylene, pass through a catalyst based on metal nanoparticles at high temperatures (around 700° C.).

The catalysts typically used are based on Fe—Ni, Fe—Co, or Fe—Mo supported on $SiO_2$, $Al_2O_3$ or MgO, and are typically prepared with the techniques of impregnation, co-precipitation and sol-gel. In the impregnation technique, the support is preformed, while in the co-precipitation and sol-gel techniques both the support and the catalyst are formed starting from soluble salts of their components, such as nitrates and/or carbonates, causing the co-precipitation thereof by means of the addition of suitable basic substances. In the sol-gel technique, the formation of the gel is typically made by means of the addition of gelling organic substances.

Examples of preparation of catalysts employed for the synthesis of carbon nanotubes are described in Avdeeva, L. B. et al., "Iron-containing catalysts of methane decomposition: accumulation of filamentous carbon", Applied Catalysis A: General 228, 53-63 (2002), Reshetenko, T. V. et al., "Coprecipitated iron-containing catalysts (Fe—Al2O3, Fe—Co—Al2O3, Fe—Ni—Al2O3) for methane decomposition at moderate temperatures: Part II. Evolution of the catalysts in reaction", Applied Catalysis A: General 270, 87-99 (2004), Kukovecz, A. et al., "Catalytic synthesis of carbon nanotubes over Co, Fe and Ni containing conventional and sol-gel silica-aluminas", Physical Chemistry Chemical Physics 2, 3071-3076 (2000) and in the patent applications WO2007/93337, WO2007/33438 and EP2213369.

Examples of preparation of carbon nanotubes with the aforesaid catalysts are also described in patents and patent applications such as EP1797950, EP2223743, U.S. Pat. Nos. 7,923,615, 8,398,949, US2001/0014307 and WO2013/105779.

SUMMARY OF THE INVENTION

The nanotubes made with the catalysts made according to the conventional techniques have several drawbacks.

The main drawback consists in the presence of a high catalyst residue in the structure of the carbon nanotubes, generally higher than 10% by weight, but also higher than 20% by weight with respect to the total weight of the carbon nanotubes structure.

The presence of this high catalyst residue requires the use of purification techniques for lowering in general the amount of residue, which makes it economically inconvenient to use carbon nanotubes in the tyre industry.

A further drawback consists in the presence in the residue of high percentages of polluting metals, in particular Ni, Co and Mo, used for making the catalyst.

The presence of polluting metals, and in particular of Ni, Co and Mo, makes it inadvisable to use nanotubes made with the conventional techniques in the tyre industry.

The Applicant has then faced the problem of making tyres comprising carbon nanotubes which overcome the aforesaid drawbacks.

The Applicant has also faced the problem of making carbon nanotubes with a reduced content of catalyst residue, and avoiding the use of particularly polluting metals such as Ni, Co and Mo.

The Applicant has found that such problem could be resolved by using catalysts substantially lacking such polluting metals, by only using Fe dispersed in $Al_2O_3$, verifying however that, using conventional preparation techniques, catalysts were obtained which provided carbon nanotubes which still required a purification in order to reduce the amount of catalyst residue.

The Applicant has also faced the problem of making iron oxides and/or aluminium oxides based catalysts that are particularly efficient in terms of carbon/catalytic residues ratio.

After numerous unsuccessful attempts, the Applicant has found that by working in suitable experimental conditions, it was possible to make an iron oxides and/or aluminium oxides based catalyst, substantially free of polluting metals, which allowed obtaining carbon nanotubes with percentages of catalyst residue lower than 10% by weight, preferably lower than 5% by weight, more preferably lower than 3% by weight, and even more preferably lower than 2% by weight, with respect to the total weight of the carbon nanotubes structure.

In particular, the Applicant has found that such results are obtained by preparing a catalyst first by working in suitable conditions of concentration of the reagents and of their relative addition times, and suitably controlling the pH of the mixture, so as to obtain the formation of an inorganic gel containing iron and/or aluminium hydroxides, and subsequently drying and calcining such gel under air or nitrogen atmosphere, in suitable temperature conditions.

The Applicant has also surprisingly found that by using the carbon nanotubes obtained with such catalyst in the elastomeric compositions used for making tyres, in addition to overcoming the drawbacks known in the art and described above, improved mechanical properties were obtained, in particular a greater and improved value of tensile strength and ultimate elongation, and consequently an improved impact and tear resistance of the tyre, a particularly desirable characteristic in the mixtures used for the production of external elements of the tyre, such as sidewalls and tread.

Therefore, in a first aspect, the present invention refers to a tyre for vehicle wheels comprising at least one structural element comprising a cross-linked elastomeric material obtained by cross-linking a cross-linkable elastomeric composition comprising carbon nanotubes, wherein said carbon nanotubes are obtained with an iron oxides and/or aluminium oxides based catalyst, substantially free of Co, Ni and Mo.

In particular, said tyre comprises at least one carcass structure having opposite lateral edges associated with respective reinforcing annular structures, a belt structure applied in a radially external position with respect to said carcass structure, a tread band applied in a radially external position to said carcass structure, and a pair of sidewalls laterally applied on opposite sides with respect to said carcass structure.

Advantageously, said structural element is selected from the group which consists of tread band, sidewall, sidewall insert, layers of elastomeric material that are radially internal with respect to said tread band, for example, underlayer and mini-sidewall, bead structures, and rubber-coating of the fabric and of the metals.

In a second aspect, the present invention refers to a process for the production of an iron oxides and/or aluminium oxides based catalyst, substantially free of Co, Ni and Mo comprising the following steps:

preparing an aqueous solution (i) comprising a $Fe^{3+}$ soluble salt and an $Al^{3+}$ soluble salt, wherein the $Fe^{3+}$ molar concentration is comprised between 0.3 and 1.5 M, and the $Al^{3+}$ molar concentration is comprised between 0.8 and 2.4 M, preparing an aqueous solution (ii) comprising ammonium hydroxide, wherein the $NH_3$ molar concentration is comprised between 1.8 and 18 M, adding the solution (ii) to the solution (i) in a manner so as to add an amount of $NH_3$ comprised between $1.3 \cdot 10^{-4}$ and $4.5 \cdot 10^{-1}$ moles per total iron and/or aluminium moles per minute, up to a pH comprised between 6 and 8 at which the gelation of the solution occurs, drying the gel at a temperature comprised between 35° C. and 100° C., and calcining the obtained solid at a temperature comprised between 250° C. and 750° C. under air or nitrogen atmosphere.

In the present description and in the following claims, with the expression "iron oxides and/or aluminium oxides based" it is intended to indicate a mixture of iron oxides, aluminium oxides, and/or mixed iron and aluminium oxides. In particular, the catalyst obtained with the process of the present invention comprises a mixture of iron oxides, aluminium oxides and/or mixed iron and aluminium oxides selected from the group consisting of hematite ($Fe_2O_3$), magnetite ($Fe_3O_4$), wustite (FeO), hercynite ($FeAl_2O_4$), other mixed iron and aluminium oxides ($Fe_{(1+x)}Al_{(2-x)}O_4$), wherein x is a decimal number comprised between 0.0 and 2.0, and alumina ($Al_2O_3$). The precise composition and the degree of crystallinity of the components depend on the selected starting reagents and on the operating conditions used, in particular those of calcination.

In addition, a third aspect of the present invention relates to a process for preparing carbon nanotubes comprising the following steps:

loading a catalyst on a porous material in a reaction chamber, bringing the temperature of said reaction chamber to the reaction temperature, and fluxing a gaseous stream of one or more gaseous hydrocarbons in the reaction chamber, characterised in that said catalyst is an iron oxides and/or aluminium oxides based catalyst substantially free of Co, Ni and Mo obtained with the preparation process of the present invention.

With the expression "substantially free" used in relation to the content of Co, Ni and Mo present in the catalyst made with the process of the present invention, it is intended an amount lower than 0.1 ppm, preferably lower than 0.01 ppm, more preferably lower than 0.001 ppm. Advantageously, the content of Co, Ni and Mo present in the catalyst made with the process of the present invention is lower than the limit of determination (LOD) of such metals.

The tyre for vehicle wheels according to the present invention comprises a structural element made by cross-linking a cross-linkable elastomeric composition comprising carbon nanotubes obtained with the process of the present invention.

The process of preparation of the carbon nanotubes typically comprises the passage of a carbon source, typically gaseous such as methane and/or ethane and/or ethylene and/or acetylene, on the catalyst brought to reaction temperature within a reactor placed in a reaction furnace.

During the step of increasing the temperature, a gaseous stream generally comprising an inert gas, such as nitrogen and/or argon, can be flowed for the purpose of eliminating the oxygen naturally present in the normal atmosphere.

Preferably, such gaseous stream is flowed at a pressure equal to about one atmosphere, with a mixture containing from 0.4 to 1 atmosphere of inert gas, from 0 to 0.4 atmospheres of hydrocarbons and from 0 to 0.4 atmospheres of hydrogen (always placing the total pressure equal to about one atmosphere).

During the formation of the nanotubes, the gaseous carbon source is preferably mixed with the inert gas, and usually with hydrogen that acts as reducing agent of the catalyst, and is able to contribute to the selectivity and to extend the lifetime of the catalyst itself.

The gaseous stream can then be constituted by a binary or ternary mixture whose total pressure is normally equal to about one atmosphere. In general, the mixture can contain from 0.4 to 0.9 atmospheres of inert gas, from 0.1 to 0.6 atmospheres of hydrocarbons and from 0 to 0.5 atmospheres of hydrogen (always placing the total pressure equal to about one atmosphere).

More particularly, in the case of use of a ternary gaseous mixture, i.e. comprising the carbon source, the inert gas and hydrogen, the partial pressure of the carbon source is comprised in the interval between 0.1 and 0.5 atmospheres, preferably between 0.2 and 0.4 atmospheres, the partial pressure of the inert gas is comprised in the interval between 0.3 and 0.8 atmospheres, preferably between 0.4 and 0.6 atmospheres, and the partial pressure of the hydrogen is comprised in the interval between 0.1 and 0.6 atmospheres, preferably between 0.2 and 0.5 atmospheres.

The catalyst is placed in a reactor, preferably cylindrical, equipped with a porous septum which acts as gas distributor. The reaction temperature can first be reached by heating the catalyst in a current of inert gas, and then by feeding the ternary or binary gaseous mixture, or by feeding the ternary or binary gaseous mixture at room temperature and then progressively raising the temperature up to the reaction temperature.

The reaction temperature is comprised between 550 and 750° C., preferably between 600 and 700° C., and more preferably around 650° C.

Alternatively, the reduction of the catalyst occurs in a preliminary step, before feeding the gaseous mixture with the carbon source. In such case, the preparation process comprises a first step of feeding with a first binary gaseous mixture comprising inert gas and hydrogen, and subsequently a second step of feeding with a second binary mixture comprising inert gas and the carbon source, such as methane and/or ethane and/or ethylene, both conducted at the reaction temperature.

Also in this case, the reaction temperature can be previously reached by heating the catalyst in the reactor within the reaction furnace in the inert gas current, or by feeding the first binary mixture at room temperature and progressively increasing the temperature up to the reaction temperature.

In the case of use of binary gaseous mixtures, i.e. comprising the carbon source or the hydrogen in mixture with the inert gas, the partial pressure of the carbon source or of the hydrogen is comprised in the interval between 0.1 and 0.5 atmospheres, preferably between 0.2 and 0.4 atmospheres, while the partial pressure of the inert gas is comprised in the interval between 0.5 and 0.9 atmospheres, preferably between 0.6 and 0.8 atmospheres.

In all cases, the reaction temperature is reached by means of controlled ramps comprised between 5 and 50° C./min, preferably between 5 and 20° C./min.

Preferably, the reaction temperature is previously reached by preheating the catalyst in the reactor within the reaction furnace in inert gas current.

According to one aspect of the present invention, the catalyst obtained with the process of the present invention is introduced into the reactor, placed in the furnace, brought to the reaction temperature in inert gas current, reduced in a hydrogen and inert gas binary mixture current, and then fed with the binary mixture of inert gas and carbon source.

According to another aspect of the present invention, the catalyst obtained with the process of the present invention is introduced into the reactor at room temperature, and then fed with the ternary mixture of inert gas, hydrogen and carbon source, progressively bringing the temperature of the furnace to the reaction temperature.

According to a further aspect of the present invention, the catalyst obtained with the process of the present invention is introduced into the reaction furnace, brought to the reaction temperature in the inert gas current, and then fed with the binary mixture of inert gas and carbon source.

The process of preparation of the carbon nanotubes according to the present invention comprises the use of the catalyst prepared with the process of the present invention.

As mentioned above, the catalyst useful in the present invention is obtained by working in suitable conditions of concentration of the reagents and of their relative addition times, and by suitably controlling the pH of the mixture, so as to obtain the formation of an inorganic gel containing iron hydroxides and/or aluminium hydroxides, and subsequently drying and calcining the resulting gel under air or nitrogen atmosphere and in suitable temperature conditions.

In particular, the aqueous solution (i) comprising a $Fe^{3+}$ soluble salt and an $Al^{3+}$ soluble salt, comprises a $Fe^{3+}$ molar concentration comprised between 0.3 and 1.5 M, preferably comprised between 0.5 and 1.1 M, and a $Al^{3+}$ molar concentration comprised between 0.8 and 2.4 M, preferably comprised between 1.2 and 1.8 M.

In the process of the present invention, any $Fe^{3+}$ soluble salt can be used, preferably iron nitrate, iron sulphate, iron carbonate, iron acetate, iron citrate, iron gluconate, iron oxalate, ammonium iron oxalate, and tris(ethylenediamine) iron sulphate. Iron salts with high solubility in water are preferred, such as iron nitrate and ammonium iron oxalate. Iron salt hydrates are advantageously used, such as iron nitrate nonahydrate and ammonium iron oxalate trihydrate.

In the process of the present invention, any $Al^{3+}$ soluble salt can be used, preferably aluminium nitrate, aluminium chloride, aluminium sulphate, aluminium carbonate, aluminium acetate, aluminium citrate, aluminium gluconate, and aluminium oxalate. Aluminium salts with high solubility in water are preferred, such as aluminium nitrate. Aluminium salt hydrates are advantageously used, such as aluminium nitrate nonahydrate.

The overall molar concentration of metallic ions $Fe^{3+}$ and $Al^{3+}$ in the aqueous solution (i) is comprised between 1.1 M and 3.9 M, preferably between 2.0 M and 2.5 M, and more preferably between 2.2 M and 2.4 M.

The aqueous solution (ii) comprising ammonium hydroxide comprises a $NH_3$ molar concentration comprised between 1.8 and 18 M, preferably comprised between 10 and 18 M.

In the process of the present invention, the addition of the solution (ii) to the solution (i) occurs in a controlled manner, in particular in a manner so as to add an amount of $NH_3$ comprised between $1.3 \cdot 10^{-4}$ and $4.5 \cdot 10^{-1}$ moles per total iron and aluminium moles per minute, preferably comprised between $2.5 \cdot 10^{-4}$ and $2 \cdot 10^{-1}$ moles of $NH_3$ per total iron and aluminium moles per minute.

The addition of the solution (ii) comprising ammonium hydroxide causes the increase of the pH up to a value comprised between 6 and 8, at which the gelation of the resulting aqueous solution takes place, with formation of a single gelled mass that incorporates all of the aqueous solvent.

In the process of the present invention, the resulting gel is dried at a temperature comprised between 35° C. and 100° C., preferably comprised between 55° C. and 80° C.

The drying step is preferably conducted in an oven, maintaining the mass under stirring, in order to optimise the removal of the solvent.

The drying step is preferably conducted for a period comprised between 6 and 12 hours, and in any case up to the removal of the aqueous solvent incorporated by the gel and upon obtainment of a solid residue.

The solid residue obtained after drying is preferably mildly ground, obtaining a grain size of the resulting powder comprised between 4 and 90 μm, preferably comprised between 10 and 50 μm.

In the process of the present invention, the solid residue is calcined at a temperature comprised between 250° C. and 750° C., preferably comprised between 350° C. and 650° C., more preferably comprised between 450° C. and 550° C., under air or nitrogen atmosphere.

The calcination step is preferably conducted for a period comprised between 30 minutes and 4 hours, preferably between 1 and 2 hours.

The solid residue obtained after calcination is preferably mildly ground, obtaining a grain size of the resulting powder, expressed as average surface equivalent spherical diameter, comprised between 10 μm and 150 μm, preferably comprised between 15 μm and 120 μm, and more preferably comprised between 30 μm and 100 μm.

The catalyst obtained with the process of the present invention shows an apparent density comprised between 0.300 and 0.900 g/cm$^3$, preferably comprised between 0.350 and 0.850 g/cm$^3$, and more preferably comprised between 0.450 and 0.750 g/cm$^3$.

The catalyst obtained with the process of the present invention shows a surface area comprised between 50 and 500 m$^2$/g, preferably comprised between 100 and 400 m$^2$/g, and more preferably comprised between 150 and 300 m$^2$/g.

The catalyst obtained with the process of the present invention preferably comprises a nominal iron content (normalizing the formulation of the catalyst as Fe+Al$_2$O$_3$) higher than 30% by weight, more preferably equal to or higher than 35% by weight, and even more preferably equal to or higher than 45% by weight.

The Applicant has found that by increasing the percentage of iron present in the catalyst obtained with the process of the present invention, it was possible to obtain carbon nanotubes with higher purity, and a lower residual percentage, lower than 10% by weight, and even lower, avoiding the need for further purifications.

The Applicant has then found that pretreating or not pretreating the catalyst obtained with the process of the present invention with a mixture of inert gas and hydrogen before feeding the binary or ternary mixture containing the carbon source does not lead to significant differences in terms of purity of the obtained nanotubes, or deposit speed of the nanotubes or of selectivity of the formation reaction of the nanotubes.

As mentioned above, the tyre for vehicle wheels according to an aspect of the present invention comprises a structural element made by cross-linking a cross-linkable elastomeric composition comprising carbon nanotubes obtained with the process of the present invention.

Preferably, said cross-linkable elastomeric composition comprises an amount of said carbon nanotubes comprised between 0.5 phr and 5 phr, more preferably 1 phr to 4 phr, and even more preferably 2 phr to 3 phr.

Advantageously, said carbon nanotubes comprise a carbon percentage equal to or higher than 90% by weight, preferably equal to or higher than 95% by weight, more preferably equal to or higher than 97% by weight and even more preferably equal to or higher than 98% by weight, with respect to the total weight of the carbon nanotubes structure.

The residual percentage of catalyst present in the nanotubes obtained with the process of the present invention is advantageously lower than 10% by weight, preferably lower than 5% by weight, more preferably lower than 3% by weight, and even more preferably lower than 2% by weight, with respect to the total weight of the carbon nanotubes structure.

The nanotubes used in the tyre of the present invention advantageously show a carbon:residual catalyst (C/r) weight ratio higher than 10:1, preferably higher than 20:1, more preferably higher than 40:1, and even more preferably higher than 50:1.

Preferably, the cross-linkable elastomeric composition used for the scopes of the present invention comprises carbon nanotubes dispersed in at least one diene elastomeric polymer.

According to a preferred embodiment, the diene elastomeric polymer that can be used in the present invention can be selected from among those commonly used in elastomeric materials that can be cross-linked with sulfur, which are particularly suitable for producing tyres, i.e. from elastomeric polymers or copolymers with an unsaturated chain having a glass transition temperature (Tg) generally lower than 20° C., preferably comprised in the interval 0° C. to −110° C. These polymers or copolymers can be of natural origin or they can be obtained by means of solution polymerisation, emulsion polymerisation or polymerisation in gaseous phase of one or more conjugated diolefins, possibly mixed with at least one comonomer selected from among monovinylarenes and/or polar comonomers.

The conjugated diolefins generally contain 4 to 12, preferably 4 to 8 carbon atoms and can be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-butadiene and isoprene are particularly preferred.

Monovinylarenes, which may be used as comonomers, generally contain 8 to 20, preferably 8 to 12 carbon atoms and can for example be selected from among: styrene; 1-vinylnaphthalene; 2-vinylnaphthalene; various alkyl derivatives, cycloalkyl derivatives, aryl derivatives, alkylaryl or arylalkyl derivates of styrene such as α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof. Styrene is particularly preferred.

Polar comonomers, which may be used, can be selected for example from among: vinylpyridine, vinylquinoline, acrylic acid esters and alkylacrylic acid esters, nitriles, or mixtures thereof, such as methyl acrylate, ethyl acrylate, methyl methacrylate, ethyl methacrylate, acrylonitrile or mixtures thereof.

Preferably, the diene elastomeric polymer that can be used in the present invention can be selected for example from among: cis-1,4-polyisoprene (natural or synthetic, preferably natural rubber), 3,4-polyisoprene, polybutadiene (in particular polybutadiene with a high content of 1,4-cis), isoprene/isobutene copolymers, possibly halogenated, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The aforesaid elastomeric composition may comprise at least one elastomeric polymer of one or more mono-olefins with an olefin comonomer or derivatives thereof. The mono-olefins can be selected from among: ethylene and α-olefins generally containing 3 to 12 carbon atoms, such as propylene, 1-butene, 1-pentene, 1-hexene, 1-octene or mixtures thereof. The following are preferred: copolymers from between ethylene and an α-olefin, possibly with a diene; isobutene homopolymers or copolymers thereof with small amounts of a diene, which are possibly at least partly halogenated. The possibly present diene generally contains 4 to 20 carbon atoms and is preferably selected from among: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among these, the following are particularly preferred: ethylene/propylene (EPR) copolymers or ethylene/propylene/diene (EPDM) copolymers; polyisobutene; butyl rubbers; halobutyl rubbers, in particular chlorobutyl or bromobutyl rubbers; or mixtures thereof.

A diene elastomeric polymer or an elastomeric polymer functionalised by means of reaction with suitable terminating agents or coupling agents can also be used. In particular, the diene elastomeric polymers obtained by means of anionic polymerisation in the presence of an organometallic initiator (in particular an organolithium initiator) can be functionalised by making the residual organometallic groups derived from the initiator react with suitable terminating agents or coupling agents such as imines, carbodiimides, alkyl tin halides, substituted benzophenones, alkoxysilanes or aryloxysilanes.

According to a preferred embodiment, said elastomeric composition also comprises a reinforcement filler mainly constituted by silica and/or silicates.

The silica that can be used in the present invention can generally be a pyrogenic silica or, preferably a precipitated silica, with a BET surface area (measured according to the Standard ISO 5794/1) comprised between about 50 m²/g and about 500 m²/g, preferably between about 70 m²/g and about 200 m²/g.

Example of silica reinforcement fillers that can be used according to the present invention and are available on the market are the products known with the names of Hi-Sil® 190, Hi-Sil® 210, Hi-Sil® 233, Hi-Sil® 243, available from PPG Industries (Pittsburgh, Pa.); or the products known with the names of Ultrasil® VN2, Ultrasil® VN3 by Evonik; or the products known with name of Zeosil® 1165MP by Rhodia.

At least one additional reinforcement filler can be advantageously added to the above-reported elastomeric composition, in an amount generally comprised between 1 phr and 70 phr, preferably between about 10 phr and about 60 phr. The reinforcement filler can be selected from among those commonly used for cross-linked products, in particular for tyres, such as carbon black, alumina, aluminosilicates, calcium carbonate, kaolin or mixtures thereof.

Advantageously, said cross-linkable elastomeric composition comprises a vulcanising agent.

The cross-linkable elastomeric composition can be vulcanised according to known techniques, in particular with sulfur based vulcanisation systems commonly used for diene elastomeric polymers. For this purpose, in the materials, after one or more thermomechanical treatment stages, a sulfur based vulcanising agent is incorporated together with vulcanisation accelerators. In the final treatment step, the temperature is generally maintained lower than 120° C. and preferably lower than 100° C., so as to prevent any undesired pre-cross-linking phenomenon.

Preferably, said vulcanising agent comprises sulfur based vulcanisation systems comprising sulfur or molecules containing sulfur (sulfur donors) together with accelerators and/or activators of vulcanisation that are known in the art.

The activators that are particularly effective are composed of zinc and in particular ZnO, ZnCO$_3$, zinc salts of saturated or unsaturated fatty acids containing 8 to 18 carbon atoms, such as zinc stearate, which are preferably formed in situ in the elastomeric composition by ZnO and fatty acid, or mixtures thereof.

The accelerators that are commonly used can be selected from among: dithiocarbamates, guanidine, thiourea, thiazoles, sulfenamides, thiurams, amines, xanthates or mixtures thereof.

According to a preferred embodiment, said cross-linkable elastomeric composition comprises an amount of vulcanising agent equal to or higher than about 1 phr, preferably equal to or higher than about 2 phr.

Preferably, the amount of vulcanising agent is lower than or equal to about 7.5 phr, preferably lower than or equal to about 7.

Advantageously the amount of sulfur is comprised between about 2 phr and about 6.5 phr.

According to a preferred embodiment, said elastomeric composition comprises a silane coupling agent capable of interacting with the silica and/or the silicates present as reinforcement filler and to bond them to the diene elastomeric polymer during vulcanisation.

According to a preferred embodiment, the silane coupling agent that can be used in the present invention can be selected from among those having at least one hydrolysable silane group, which for example can be identified by the following general formula (II):

$$(R)_3Si-C_nH_{2n}-X \qquad (II)$$

where the R groups, which can be identical or different, are selected from among: alkyl, alkoxy or aryloxy groups or from halogen atoms, provided that at least one of the R groups is an alkoxy or aryloxy group; n is an integer between 1 and 6 (including 6); X is a group selected from among: nitrous, mercapto, amine, epoxide, vinyl, imide, chloro, $-(S)_mC_nH_{2n}-Si-(R)_3$ or $-S-COR$, wherein m and n are integer numbers between 1 and 6 (including 6) and the R groups are defined as stated above.

Among the silane coupling agents, those particularly preferred are bis(3-triethoxysilylpropyl) tetrasulphide and bis(3-triethoxysilylpropyl) disulphide. Said coupling agents can be used as is or as a suitable mixture with an inert filler so as to facilitate their incorporation in the elastomeric composition.

According to a preferred embodiment, said silane coupling agent is present in the elastomeric composition in an amount comprised between 0.01 phr and about 10 phr, preferably between about 0.5 phr and about 5 phr.

Said elastomeric composition can comprise other commonly used additives, selected on the basis of the specific application for which the composition is intended. For example, the following can be added to said materials:

antioxidants, anti-aging agents, plasticising agents, adhesives, anti-ozone agents, modifying resins or mixtures thereof.

In particular, for the purpose of improving the workability, a plasticising agent can be added to said elastomeric composition. Such plasticising agent is generally selected from among mineral oils, plant oils, synthetic oils or mixtures thereof, such as aromatic oil, naphthenic oil, soy oil or mixtures thereof. The amount of plasticising agent is generally comprised between 0 phr and about 70 phr, preferably between about 5 phr and about 30 phr.

The elastomeric composition can be prepared by mixing the polymer components together with the reinforcement filler and with the other additives possibly present according to the techniques known in the art. The mixing can for example be executed by using an open mixer of "open-mill" type and/or an internal mixer of the type with tangential rotors (Banbury®), and/or with interlocking rotors (Intermix™), and/or in continuous mixers of Ko-Kneader™ type, and/or of the type with twin screws or multi-screws.

DRAWINGS

Figure 2:
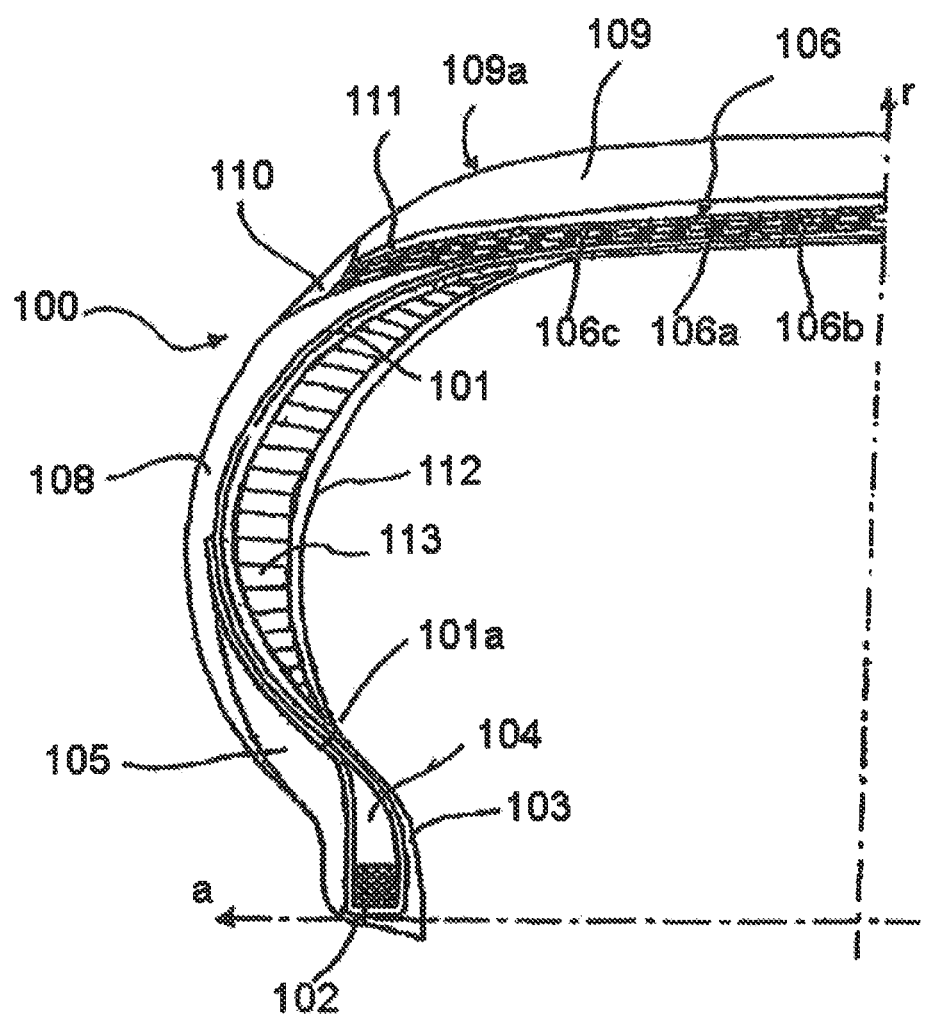
Figure 3:
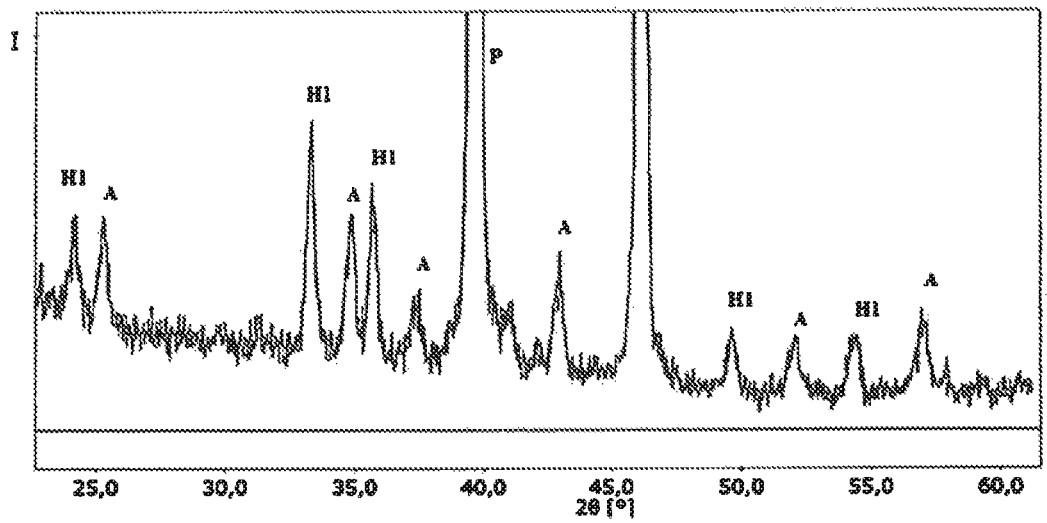
Figure 4:
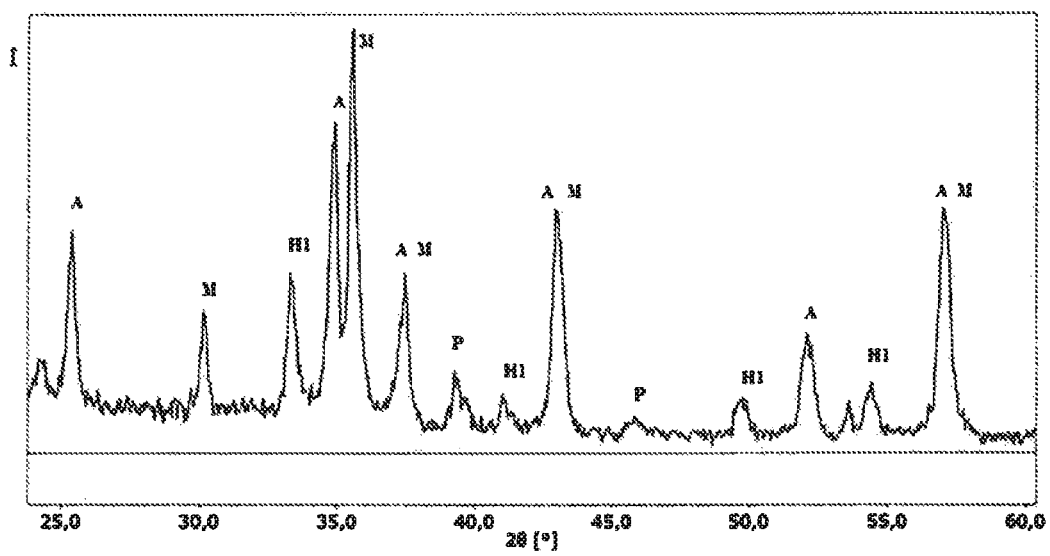
Figure 5:
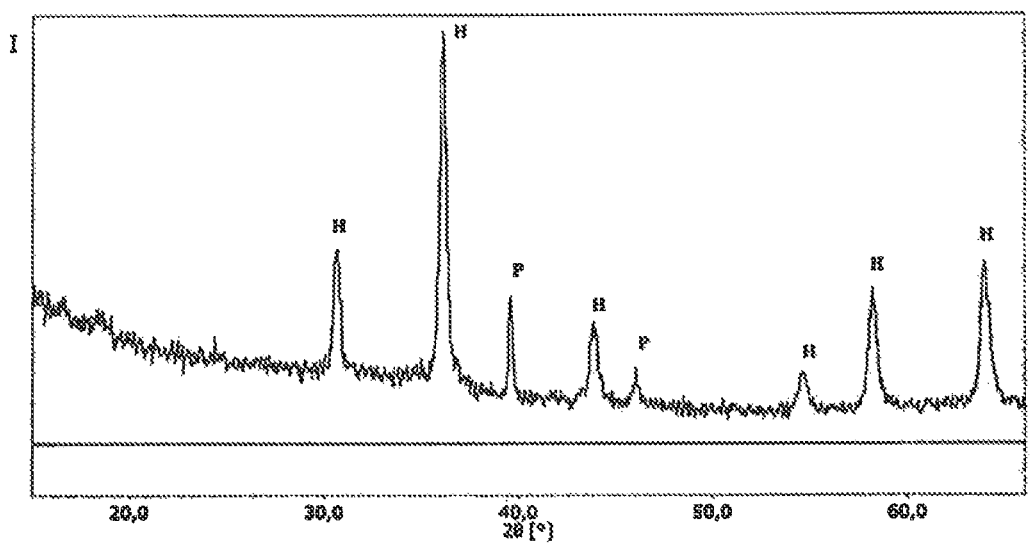

The description will be set forth hereinbelow, with reference to the enclosed drawings, provided only as a non-limited example and in which:

FIG. 1 illustrates, in half cross section, a tyre for motor vehicle wheels according to a first embodiment of the present invention, FIG. 2 illustrates, in half cross section, a tyre for motor vehicle wheels according to a second embodiment of the present invention, FIG. 3 represents the diffraction spectrum of the catalyst CAT-1SG-35-A obtained as described in example 1, FIG. 4 represents the diffraction spectrum of the catalyst CAT-1SG-35-N2 obtained as described in example 1, and FIG. 5 represents the diffraction spectrum of the catalyst CAT-2SG-35-N2, obtained as described in example 2.

DETAILED DESCRIPTION OF THE INVENTION

In FIGS. 1 and 2, "a" indicates an axial direction and "r" indicates a radial direction. For the sake of simplicity, FIGS. 1 and 2 only show one portion of the tyre, the remaining not represented portion being identical and symmetrically arranged with respect to the radial direction "r".

With reference to FIG. 1, the tyre 100 for motor vehicle wheels comprises at least one carcass structure, comprising at least one carcass layer 101 having respectively opposite end flaps engaged with respective anchoring annular structures 102, termed bead cores, possibly associated with a bead filler 104. The zone of the tyre comprising the bead core 102 and the filler 104 forms a reinforcing annular structure 103, the so-called bead, intended for anchoring the tyre on a corresponding mounting rim, not illustrated.

The reinforcing annular structure 103, and in particular the bead filler 104, are advantageously made with the previously-described elastomeric composition comprising nanotubes, since such elements are particularly subjected to mechanical stresses in use conditions during the rolling of the tyre, since directly in contact with the rim of the wheel.

The carcass structure is usually of radial type, i.e. the reinforcement elements of the at least one carcass layer 101 are situated on planes comprising the rotation axis of the tyre and substantially perpendicular to the equatorial plane of the tyre. Said reinforcement elements are generally constituted by textile cords, e.g. rayon, nylon, polyester (e.g. polyethylene naphthalate (PEN)). Each reinforcing annular structure is associated with the carcass structure by means of backward bending of the opposite lateral edges of the at least one carcass layer 101 around the anchoring annular structure 102 so as to form the so-called turned-up elements of the carcass 101a as illustrated in FIG. 1.

In one embodiment, the coupling between carcass structure and reinforcing annular structure can be provided by means of a second carcass layer (not represented in FIG. 1) applied in an axially external position with respect to the first carcass layer.

An anti-abrasive strip 105 is arranged in an external position of each reinforcing annular structure 103. Preferably each anti-abrasive strip 105 is arranged at least in axially external position with respect to the reinforcing annular structure 103, being extended at least between the sidewall 108 and the portion that is radially lower with respect to the reinforcing annular structure 103.

Preferably the anti-abrasive strip 105 is arranged so as to enclose the reinforcing annular structure 103 along the axially internal and external and radially lower zones of the reinforcing annular structure 103 in a manner so as to be interposed between the latter and the rim of the wheel when the tyre 100 is mounted on the rim.

The carcass structure is associated with a belt structure 106 comprising one or more belt layers 106a, 106b situated in radial superimposition with respect to each other and with respect to the carcass layer, having typically metallic reinforcement cords. Such reinforcement cords can have cross orientation with respect to a circumferential extension direction of the tyre 100. By "circumferential" direction it is intended a direction generally directed according to the tyre rotation direction.

In radially more external position with respect to the belt layers 106a,106b, at least one zero degree reinforcement layer 106c can be applied, commonly known as "0° belt", which generally incorporates a plurality of reinforcement cords, typically textile cords, oriented in a substantially circumferential direction, thus forming an angle of a few degrees (e.g. an angle between about 0° and 6°) with respect to the equatorial plane of the tyre, and covered with an elastomeric material.

In a radially external position with respect to the belt structure 106, a tread band 109 made of elastomeric mixture is applied.

Respective sidewalls 108 made of elastomeric mixture obtained according to the present invention are also applied in axially external position on the lateral surfaces of the carcass structure, each extended from one of the lateral edges of the tread 109 up to the respective reinforcing annular structure 103.

In a radially external position, the tread band 109 has a rolling surface 109a intended to come into contact with the ground. Circumferential grooves, which are connected by transverse cuts (not shown in FIG. 1) so as to define a plurality of blocks of various shape and size distributed on the rolling surface 109a, are generally made in this surface 109a, which for the sake of simplicity in FIG. 1 is represented smooth.

An underlayer 111 is arranged between the belt structure 106 and the tread band 109.

A strip constituted by elastomeric material 110, commonly known as "mini-sidewall", may be present in the zone of connection between the sidewalls 108 and the tread band 109, this mini-sidewall generally being obtained by co-extrusion with the tread band 109 and allowing an improvement of the mechanical interaction between the tread band 109 and the sidewalls 108. Preferably the end portion of the sidewall 108 directly covers the lateral edge of the tread band 109.

The tread band, and/or the underlayer, and/or the mini-sidewall and/or the sidewall and/or the anti-abrasive strip and/or the rubber-coating mixtures of the carcass structure and/or belt structure can advantageously be made with the previously described elastomeric composition comprising nanotubes, since a greater tensile strength confers greater tear resistance, and consequently greater resistance and duration of the surface of the sidewall and of the tread, particularly exposed to sudden mechanical stresses during use (due for example to the roughness of the road surface, to impact with sidewalks during parking manoeuvres, and so forth). In addition, the previously described elastomeric composition comprising nanotubes will be electrically conductive even in the presence of silica as main filler, collaborating to construct a conductive path between the rim and the ground.

In the case of tyres without inner tube, a rubber layer 112, generally known as "liner", which provides the necessary impermeability to the tyre inflation air, can also be provided in a radially internal position with respect to the carcass layer 101.

The self-supporting tyres (100), an example of which being illustrated in FIG. 2, include a support structure capable of supporting the load of the vehicle under a considerable or total loss of pressure. In particular, a sidewall insert (113), made according to the present invention, can be associated with each sidewall. In each side of the self-supporting tyre (100), the sidewall insert (113) is radially extended between the relevant bead structure (103) and the corresponding lateral edge of the tread band (109). Each sidewall insert (113) can be made of one or more portions and is situated in an axially internal or external position with respect to the carcass ply. For example, as represented in FIG. 2, the sidewall insert (113) is situated between the carcass ply (101) and the liner (112).

Alternatively, if more than one carcass ply is present, a sidewall insert (113) can be situated between two of said carcass plies (not shown in FIG. 2).

Alternatively, a sidewall insert (113) can be situated between the carcass ply and the sidewall (not shown in FIG. 2).

The sidewall insert can be advantageously made with the previously described elastomeric composition comprising nanotubes, since in work conditions with the tyre deflated it must have good tear propagation resistance (obtainable when there are higher properties at break, especially higher ultimate elongation properties).

According to a non-illustrated embodiment, the tyre can be a tyre for wheels for heavy transport vehicles, such as trucks, buses, trailers, vans, and generally for vehicles in which the tyre is subjected to a high load. According to a further non-illustrated embodiment, the tyre can be a tyre for vehicles with two wheels, for example for motorcycles.

The building of the above-described tyres 100 can be actuated by means of assembly of respective semifinished products on a forming drum, not illustrated, by at least one assembly device.

On the forming drum, at least one part of the components intended to form the carcass structure of the tyre can be built and/or assembled. More particularly, the forming drum is adapted to receive first the possible liner, then the carcass structure and the anti-abrasive strip. Subsequently, devices (not shown) coaxially engage, around each of the end flaps, one of the anchoring annular structures, position an external sleeve comprising the belt structure and the tread band in a position coaxially centred around the cylindrical carcass sleeve and shape the carcass sleeve according to a toroidal configuration by means of a radial dilation of the carcass structure, so as to determine the application thereof against a radially internal surface of the external sleeve.

Following the building of the green tyre, a moulding and vulcanisation treatment is executed aimed to determine the structural stabilisation of the tyre by means of cross-linking of the elastomeric mixtures as well as to impart a desired tread design on the tread band and to impart possible distinctive graphic marks at the sidewalls.

The present invention will be further illustrated hereinbelow by means of a number of preparation examples, which are merely provided as a non-limiting example of this invention.

Example 1

Preparation of CAT-1SG-50-N2 and CAT-1SG-50-A

Iron nitrate nonahydrate (126.66 g) and aluminium nitrate nonahydrate (128.77 g) were dissolved in 140 mL of water. A solution of ammonium hydroxide (circa 17 M) was dripped under stirring, up to a pH about 7, at which gelation occurred. The addition of ammonia occurred with constant speed and lasted 30 minutes. The gel was dried at 60° C. for 12 hours, then mildly ground (average surface equivalent spherical diameter ($d_s$) 37.88 µm), then it was divided into 2 aliquots of equal weight, calcining one in a nitrogen current and the other in an air current, at 500° C. for 90 minutes. Thus, 17.86 g of CAT-1SG-50-N2 and 17.40 g of CAT-1SG-50-A were respectively obtained, with an overall yield of 83% with respect to the theoretical.

Both the catalysts had a nominal catalyst content (normalizing the formulation as $Fe+Al_2O_3$) equal to 50% by weight with a fraction by weight of iron after calcination equal to 0.412.

Proceeding in an analogous manner, the catalysts CAT-1SG-35-N2 and CAT-1SG-35-A were obtained, with a nominal catalyst content (normalizing the formulation as $Fe+Al_2O_3$) equal to 35% by weight with a fraction by weight of iron after calcination equal to 0.304, and the catalysts CAT-1SG-25-N2 and CAT-1SG-25-A, with a nominal catalyst content (normalizing the formulation as $Fe+Al_2O_3$) equal to 25% by weight with a fraction by weight of iron after calcination equal to 0.226.

The following table 1 reports some analytical data of the obtained catalysts. The average surface equivalent diameter was obtained starting from the measurements made with an ultrasound granulometer CILAS 1180L. The surface area was obtained by means of BET analysis by using a Micromeritics Tristar II Series instrument. The apparent density was measured in accordance with the EN ISO 60:1977 regulation.

TABLE 1

| | Average surface equivalent spherical diameter [µm] | Apparent density [g/cm$^3$] | Surface area [m$^2$/g] |
| --- | --- | --- | --- |
| CAT-1SG-50-N2 | 87.81 | 0.503 | 223 ± 4 |
| CAT-1SG-50-A | 83.39 | 0.637 | 207 ± 4 |
| CAT-1SG-35-N2 | 87.55 | 0.470 | 245 ± 5 |
| CAT-1SG-35-A | 83.65 | 0.533 | 241 ± 4 |

TABLE 1-continued

| | Average surface equivalent spherical diameter [μm] | Apparent density [g/cm³] | Surface area [m²/g] |
|---|---|---|---|
| CAT-1SG-25-N2 | 88.80 | 0.564 | 286 ± 5 |
| CAT-1SG-25-A | 84.16 | 0.582. | 278 ± 5 |

FIGS. 3 and 4 respectively represent the diffraction spectra of the catalyst CAT-1SG-35-A and CAT-1SG-35-N2, obtained by using a Philips X'Pert MPD instrument equipped with a graphite analyser, a radiation source Cu K-alpha and a power of 40 kV+40 mA.

As shown, phases were found corresponding to alumina (peaks A), hematite (peaks H1), and magnetite (peaks M). The peak P represents the peak of platinum, the material with which the specimen-holder is made.

Example 2

Preparation of CAT-2SG-35-N2

Ammonium iron(III) oxalate trihydrate (67.66 g) and aluminium nitrate nonahydrate (119.00 g) were dissolved in 150 mL of water. A solution of ammonium hydroxide (circa 17 M) was dripped under stirring, up to a pH about 7, at which gelation occurred. The addition of ammonia occurred with constant speed and lasted 20 minutes. Such gel was placed on a Buchner filter and carefully washed with 3 aliquots of 50 mL water. It was then dried at 80° C. for 10 hours and then mildly ground (10-100 μm). The solid thus obtained was calcined under nitrogen atmosphere at 505° C. for 2 hours, leading to the obtainment of 22.80 g of catalyst, with a yield of 91% with respect to the theoretical.

The following table 2 reports some analytical data of the obtained catalyst. The measurements were carried out with the same techniques and instruments reported in example 1.

TABLE 2

| | Average surface equivalent spherical diameter [μm] | Apparent density [g/cm³] | Surface area [m²/g] |
|---|---|---|---|
| CAT-2SG-35-N2 | 37.95 | 0.486 | 168 ± 4 |

FIG. 5 represents the diffraction spectrum of the catalyst CAT-2SG-35-N2, obtained as described in example 1. The diffraction spectrum of FIG. 5 reveals the presence of a hercynite phase, $FeAl_2O_4$, represented by the peaks H.

Example 3

Synthesis of the Carbon Nanotubes

The synthesis process consists of the CCVD method (catalytic chemical vapour deposition), which is conducted in particular in batch reactors with quartz fluid bed, provided with a porous septum which functions as distributor.

Nanotubes CNT1-SG1

2 grams of catalyst CAT-1SG-50-N2, prepared as in example 1, were fed in the reactor and the temperature was brought to 650° C. by means of a heating ramp of 15° C./min in nitrogen current. Then, the catalyst is reduced in a hydrogen/nitrogen current with the ratio in partial pressures 0.3:0.7 for about 60 minutes. Subsequently, an ethylene/nitrogen mixture was fed, with the ratio under partial pressures 0.2:0.8 for 60 minutes, during which the deposit of carbon occurs. At the end of the experiment, 51 g of product were obtained.

Nanotubes CNT2-SG1

The procedure was repeated by using 2 grams of catalyst CAT-1SG-50-A, prepared as in example 1.

Nanotubes CNT3-SG1

The procedure was repeated by using 2 grams of catalyst CAT-1SG-35-N2, prepared as in example 1.

Nanotubes CNT4-SG1

The procedure was repeated by using 2 grams of catalyst CAT-1SG-35-A, prepared as in example 1.

Nanotubes CNT5-SG1

The procedure was repeated by using 2 grams of catalyst CAT-1SG-25-N2, prepared as in example 1.

Nanotubes CNT6-SG1

The procedure was repeated by using 2 grams of catalyst CAT-1SG-25-A, prepared as in example 1.

The nanotubes thus obtained were subjected to thermogravimetric analysis. The following table 3 illustrates the obtained results, expressed as residual percentage (r), carbon percentage (C), carbon over iron weight ratio (C/Fe), and carbon over residue weight ratio (C/r).

TABLE 3

| Nanotubes | Catalyst | r [% wt.] | C [% wt.] | C/Fe | C/r |
|---|---|---|---|---|---|
| CNT1-SG1 | CAT-1SG-50N2 | 1.807 | 97.486 | 131.072 | 53.949 |
| CNT2-SG1 | CAT-1SG-50A | 2.294 | 97.155 | 102.895 | 42.352 |
| CNT3-SG1 | CAT-1SG-35N2 | 4.053 | 94.981 | 77.037 | 23.435 |
| CNT4-SG1 | CAT-1SG-35A | 4.319 | 95.036 | 72.334 | 22.004 |
| CNT5-SG1 | CAT-1SG-25N2 | 13.596 | 85.276 | 27.789 | 6.272 |
| CNT6-SG1 | CAT-1SG-25A | 14.414 | 84.771 | 26.057 | 5.881 |

The nanotubes thus obtained were conveniently used as is in the mixtures. Alternatively they were used after having subjected them to a humid purification carried out with 20% w/w sulphuric acid at 95° C. so as to further reduce the catalytic residue. In such a manner, purities higher than 98% were attained in all cases.

Example 4

Nanotubes CNT7-SG2

2 grams of catalyst CAT-2SG-35-N2, prepared as in example 2, were fed into the reactor. Subsequently an ethylene/hydrogen/nitrogen mixture was fed, with the ratio under partial pressures 0.2:0.3:0.5 and the temperature was brought to 650° C. by means of a heating ramp of 15° C./min. The system is maintained at such temperature for 60 minutes, during which the carbon deposit occurs. At the end of the experiment, 29 g of product was obtained.

The nanotubes thus obtained were subjected to thermogravimetric analysis, by using a model TDA SDT Q600 instrument. The following table 4 illustrates the obtained results, expressed as residual percentage (r), carbon percentage (C), carbon over iron weight ratio (C/Fe), and carbon over residue weight ratio (C/r).

TABLE 4

| Nanotubes | Catalyst | r [% wt.] | C [% wt.] | C/Fe | C/r |
|---|---|---|---|---|---|
| CNT7-SG2 | CAT-2SG-35N2 | 6.743 | 93.242 | 45.457 | 13.828 |

Example 5

The elastomeric materials reported in the following table 5 were prepared in the following manner (the amounts of the various components are indicated in phr).

All the components, except for sulfur and accelerant (TBBS), were mixed in an internal mixer (Pomini PL 1.6 model) for about 5 minutes ($1^a$ step). As soon as the temperature reached 145±5° C., the elastomeric composition was unloaded. Sulfur and accelerant (TBBS) were added and the mixing was carried out in an open roller mixer ($2^a$ step).

TABLE 5

| INGREDIENTS | MIXTURE | | |
|---|---|---|---|
| | R1 | I1 | I2 |
| FIRST STEP | | | |
| BR | 50 | 50 | 50 |
| IR | 50 | 50 | 50 |
| NC7000 | 2 | — | — |
| purified standard nanotubes | — | 2 | — |
| Purified CNT2-SG1 | — | — | 2 |
| Stearic acid | 1.5 | 1.5 | 1.5 |
| VN3 silica | 33 | 33 | 33 |
| Zinc oxide | 4 | 4 | 4 |
| 6PPD | 2 | 2 | 2 |
| SECOND STEP | | | |
| TBBS | 1.9 | 1.9 | 1.9 |
| Insoluble sulfur | 3.1 | 3.1 | 3.1 |

R1: Reference
I1: Invention
I2: Invention

BR is a polybutadiene rubber SKD with Neodymium catalyst having more than 97% cis butadiene,
IR is a high cis-1,4-polyisoprene synthetic rubber, SKI-3, Lee Rubber,
NC7000 is commercial carbon in nanotubes, Nanocyl SA, 90 (wt) % purity in nanotubes, 5.9% Al, 0.2% Co,
Standard nanotubes were prepared according to the patent EP2213369 (B1) and purified with diluted sulphuric acid and have a purity of 95.86 (wt) % in nanotubes, 0.87 (wt) % Al, with Ni, Mo, and Co below the limit of detectability,
purified CNT2_SG1 (purified with diluted sulphuric acid) have a purity of 98.33 (wt) % in nanotubes, 0.01 (wt) % Al, with Ni, Mo, and Co below the limit of detectability,
VN3 silica is a precipitated silica with surface area of 180 m$^2$/g, Evonik Industries, Germany,
6PPD is antioxidant aromatic amine N-(1,3-dimethylbutyl)-N'-phenyl-p-phenylene-diamine, Lanxess Deutschland GmbH, Germany,
TBBS is a dispersion of N-tert-butyl-2-benzothiazole-sulfenamide, Lanxess Deutschland GmbH, Germany.

The metal content in the nanotubes was measured by means of the ICP/OES (Inductively coupled plasma Optical Emission Spectroscopy) technique, by using a model Perkin Elmer Optima 200DV instrument.

A specimen of nanotubes to be analysed was mineralised with a mixture of concentrated $HNO_3$ and $H_2O_2$. The resulting clear solution was suitably diluted in 1% ultrapure $HNO_3$ and subjected to ICP/OES analysis.

The green mixtures were subjected to MDR (Moving Die Rheometer) measurements in order to verify the cross-linking kinetics thereof. The rheometric analysis MDR was carried out by using a MDR Monsanto rheometer. The test was conducted at 170° C. for 20 minutes with an oscillation frequency of 1.66 Hz (100 oscillations per minute) and an oscillation amplitude of ±0.5°. The minimum torque (ML) and maximum torque (MH) values were measured.

The Mooney ML (1+4) viscosity at 100° C. was measured, according to the standard ISO 289-1:2005, on non-cross-linked materials, obtained as described above.

The static mechanical properties according to the standard UNI 6065 were measured at different elongations (CA05—50%, CA1—100%, and CA3—300%) on samples of the abovementioned elastomeric materials, vulcanised at 170° C. for 10 minutes.

The dynamic mechanical properties E' and Tan delta were measured by using a dynamic device Instron model 1341 in the tensile-compression mode according to the following methods. A test piece of cross-linked material (170° C. for 10 minutes) having cylindrical shape (length=25 mm; diameter=14 mm), preloaded under compression up to a longitudinal deformation of 25% with respect to the initial length and maintained at the predetermined temperature (23° C., 70° C. or 100° C.) for the entire duration of the test was subjected to a dynamic sinusoidal stress having an amplitude of ±3.5% with respect to the length under pre-loading, with a frequency of 100 Hz. The dynamic mechanical properties are expressed in terms of values of dynamic elastic modulus (E') and Tan delta (loss factor). The Tan delta value was calculated as a ratio between the dynamic viscous modulus (E") and the dynamic elastic modulus (E'). The thermoplastic behaviour was evaluated as the difference ΔE' between the dynamic elastic modulus values measured at two reference temperatures selected on the basis of the type of elastomeric composition and of its application in the tyre.

The dynamic mechanical properties G' and Tan delta were also measured by using a RPA Alpha Technologies device in shear mode. A disc-shaped specimen (volume=5 cm$^3$) of cross-linked elastomeric composition (170° C. for 10 minutes) was subjected to the measurement of the dynamic elastic shear modulus (G') at 70° C., frequency 10 Hz, deformation 0.4% to 10%. The dynamic mechanical properties are expressed in terms of values of dynamic elastic shear modulus (G') and Tan delta (loss factor). The Tan delta value was calculated as a ratio between the dynamic viscous shear modulus (G") and the dynamic elastic shear modulus (G').

The hardness in IRHD degrees (at 23° C. and 100° C.) was measured according to the standard ISO 48:2007, on samples of the mixtures immediately after the cross-linking at 170° C. for 10 minutes. The results were summarised in the following table 6

TABLE 6

| SPECIMEN | R1 | I1 | I2 |
|---|---|---|---|
| Mooney ML (1 + 4) viscosity 100° C. | 62 | 60 | 62 |
| MDR MEASUREMENTS | | | |
| ML (dN m) | 2.29 | 2.13 | 2.32 |
| MH (dN m) | 20.70 | 19.50 | 20.55 |
| TS2[min] | 1.88 | 2.05 | 1.96 |
| T30[min] | 2.72 | 2.88 | 2.80 |
| T60[min] | 3.16 | 3.34 | 3.24 |
| T90[min] | 4.54 | 4.51 | 4.38 |
| STATIC MECHANICAL PROPERTIES | | | |
| Ca0.5[MPa] | 1.47 | 1.33 | 1.42 |
| Ca1[MPa] | 2.71 | 2.33 | 2.56 |
| Ca3[MPa] | 10.08 | 9.11 | 10.04 |

TABLE 6-continued

| SPECIMEN | R1 | I1 | I2 |
|---|---|---|---|
| CR[MPa] | 10.67 | 12.87 | 13.17 |
| AR[%] | 344.7 | 420.0 | 411.4 |
| IRHD 23° C. | 67.6 | 66.4 | 67.4 |
| IRHD 100° C. | 65.0 | 65.1 | 65.6 |
| DYNAMIC MECHANCAL PROPERTIES | | | |
| E' (23° C. - 100 Hz) (MPa) | 6.79 | 6.50 | 6.88 |
| E' (70° C. - 100 Hz) (MPa) | 6.32 | 6.13 | 6.47 |
| E' (100° C. - 100 Hz) (MPa) | 6.09 | 6.10 | 6.42 |
| Tan delta (23° C.) | 0.105 | 0.100 | 0.099 |
| Tan delta (70° C.) | 0.061 | 0.057 | 0.058 |
| Tan delta (100° C.) | 0.040 | 0.037 | 0.037 |
| RPA MEASUREMENTS | | | |
| G' 9% (MPa) | 1.18 | 1.13 | 1.22 |
| Tan delta (9%) | 0.096 | 0.090 | 0.090 |

The results obtained in the static test of table 6 demonstrated that the mixture of the invention I1 and I2, comprising the nanotubes obtained from an iron oxides and/or aluminium oxides based catalyst substantially free of Co, Ni and Mo, allowed having higher elongation values and above all higher tensile strength with respect to the reference R1, predictive of an improved tear resistance, without substantial variations of the other static, dynamic or rheological characteristics.

In order to verify if possible residues of Fe in the nanotubes according to the invention give rise to undesired early aging phenomena of the mixtures, the Applicant carried out several thermal aging tests on samples of mixture I1 and I2, maintaining them at 70° C. for 7 days under air. Such tests did not show substantial variations of the mechanical properties of the mixture, in particular of the properties at break, with respect to mixtures lacking nanotubes. The Applicant, without wishing to be tied to any interpretation theory, deems that this is due to the fact that the nanotubes according to the invention are capable of not exposing ferrous particles towards the mixture, instead maintaining them effectively confined inside the structure of the nanotubes themselves.

Example 6

The elastomeric materials reported in the following table 7 were prepared in the following manner (the amounts of the various components are indicated in phr).

All the components, except for sulfur and accelerant (TBBS), were mixed in an internal mixer (Pomini model PL 1.6) for about 5 minutes (1$^a$ step). As soon as the temperature reached 145±5° C., the elastomeric composition was unloaded. Sulfur and accelerant (TBBS) were added and the mixing was carried out in an open roller mixer (2$^a$ step).

TABLE 7

| | MIXTURE | | |
|---|---|---|---|
| INGREDIENTS | R2 | I3 | I4 |
| FIRST STEP | | | |
| BR | 50 | 50 | 50 |
| IR | 50 | 50 | 50 |
| NC7000 | 4 | — | — |
| CNT2-SG1 | — | 4 | — |
| Purified CNT2-SG1 | — | — | 4 |
| Stearic acid | 1.5 | 1.5 | 1.5 |
| Caorso | 5.4 | 5.4 | 5.4 |

TABLE 7-continued

| | MIXTURE | | |
|---|---|---|---|
| INGREDIENTS | R2 | I3 | I4 |
| VN3 silica | 27 | 27 | 27 |
| Zinc oxide | 4 | 4 | 4 |
| 6PPD | 2 | 2 | 2 |
| SECOND STEP | | | |
| TBBS | 1.9 | 1.9 | 1.9 |
| Insoluble sulfur | 3.1 | 3.1 | 3.1 |

R2: Reference
I3: Invention
I4: Invention

BR is a polybutadiene rubber SKD with Neodymium catalyst having more than 97% cis butadiene,
IR is a high cis-1,4-polyisoprene synthetic rubber, SKI-3, Lee Rubber,
NC7000 is commercial carbon in nanotubes, Nanocyl SA, 90 (wt) % purity in nanotubes, 5.9 (wt) % Al, 0.2 (wt) % Co,
CNT2-SG1 has a purity of 91.85 (wt) % in nanotubes, 2.90 (wt) % Al, with Ni, Mo, and Co below the detectability level,
purified CNT2-SG1 was purified with diluted sulphuric acid and has a purity of 98.33 (wt) % in nanotubes, 0.01 (wt) % Al, with Ni, Mo, and Co below the detectability level,
VN3 silica is precipitated silica with surface area of 180 m$^2$/g, Evonik Industries, Germany,
6PPD is antioxidant aromatic amine N-(1,3-dimethyl-butyl)-N'-phenyl-p-phenylene-diamine, Lanxess Deutschland GmbH, Germany,
TBBS is a dispersion of N-tert-butyl-2-benzothiazole-sulfenammide, Lanxess Deutschland GmbH, Germany.

The mixtures (green or cross-linked at 170° C. for 10 minutes) were subjected to the same measurements illustrated in the example 6.

The volumetric electrical resistivity was measured according to the standard UNI 4288-72 by using the isolation measurement tester "NORMA UNILAP ISO X" by Siemens. The results were summarised in the following table 8.

TABLE 8

| SPECIMEN | R2 | I3 | I4 |
|---|---|---|---|
| Mooney ML (1 + 4) viscosity 100° C. | 63 | 63 | 64 |
| MDR MEASUREMENTS | | | |
| ML (dN m) | 2.35 | 2.24 | 2.33 |
| MH (dN m) | 20.77 | 20.14 | 20.71 |
| TS2[min] | 1.99 | 1.79 | 1.81 |
| T30[min] | 2.81 | 2.58 | 2.60 |
| T60[min] | 3.23 | 3.01 | 3.03 |
| T90[min] | 4.39 | 4.19 | 4.23 |
| STATIC MECHANICAL PROPERTIES | | | |
| Ca0.5[MPa] | 1.62 | 1.53 | 1.60 |
| Ca1[MPa] | 3.10 | 2.94 | 3.05 |
| Ca3[MPa] | 10.48 | 10.99 | 11.07 |
| CR[MPa] | 10.27 | 12.15 | 13.50 |
| AR[%] | 321.0 | 333.6 | 377.6 |
| IRHD 23° C. | 68.0 | 66.4 | 67.4 |
| IRHD 100° C. | 66.1 | 64.1 | 64.6 |
| DYNAMIC MECHANCAL PROPERTIES | | | |
| E' (23° C. - 100 Hz) (MPa) | 6.27 | 6.07 | 6.27 |
| E' (70° C. - 100 Hz) (MPa) | 5.99 | 5.71 | 5.96 |

TABLE 8-continued

| SPECIMEN | R2 | I3 | I4 |
|---|---|---|---|
| Tan delta (23° C.) | 0.129 | 0.126 | 0.130 |
| Tan delta (70° C.) | 0.088 | 0.085 | 0.086 |
| RPA MEASUREMENTS | | | |
| G' 9% (MPa) | 1.18 | 1.12 | 1.15 |
| Tan delta (9%) | 0.107 | 0.100 | 0.105 |
| Electrical conductivity | | | |
| Volumetric resistivity (kOhm*m) | 6.7 | 11.0 | 2.2 |

Also the results obtained in the static tests of table 8 confirmed that the mixtures I3 and I4, comprising the nanotubes obtained with the process of the present invention, allowed having higher values of elongation and above all higher tensile strength with respect to the reference R, predictive of an improved tear resistance, without substantial variations of the other static, dynamic and rheological characteristics. Along with this there is a substantial maintenance of the required electrical conductivity level, as confirmed by the volumetric electrical resistivity values reported in table 8 for the reference mixture R2 and for the mixture of the invention I3 and I4, substantially equivalent for the purpose of obtaining a suitable anti-static effect.

The invention claimed is:

1. A process for producing iron oxide and/or aluminium oxide catalysts substantially free of Co, Ni, and Mo comprising:

preparing an aqueous solution (i) comprising a $Fe^{3+}$ soluble salt and an $Al^{3+}$ soluble salt, wherein the solution (i) comprises a molar concentration of $Fe^{3+}$ ranging from 0.3 to 1.5 M and a molar concentration of $Al^{3+}$ ranging from 0.8 to 2.4 M, preparing an aqueous solution (ii) comprising ammonium hydroxide, wherein the solution (ii) comprises a molar concentration of $NH_3$ ranging from 1.8 to 18 M, adding solution (ii) to solution (i), wherein an amount of $NH_3$ added per minute ranges from $1.3 \cdot 10^{-4}$ to $4.5 \cdot 10^{-1}$ moles per total moles of iron or aluminium or both iron and aluminium, resulting in a combined solution with a pH ranging from 6 to 8, wherein a gel of the combined solution forms, drying the gel at a temperature ranging from 35° C. to 100° C. to obtain a solid, and calcining the obtained solid at a temperature ranging from 250° C. to 750° C. under an atmosphere chosen from air and nitrogen.

2. The process according to claim 1, wherein the $Fe^{3+}$ molar concentration ranges from 0.5 to 1.1 M.

3. The process according to claim 1, wherein the $Al^{3+}$ molar concentration ranges from 1.2 to 1.8 M.

4. The process according to claim 1, wherein the $NH_3$ molar concentration ranges from 10 to 18 M.

5. The process according to claim 1, wherein the amount of $NH_3$ added per minute during the addition of solution (ii) to solution (i) ranges from $2.5 \cdot 10^{-4}$ to $2 \cdot 10^{-1}$ moles per total moles of iron and aluminium.

* * * * *

UNITED STATES PATENT AND TRADEMARK OFFICE
CERTIFICATE OF CORRECTION

PATENT NO. : 11,208,542 B2
APPLICATION NO. : 16/467190
DATED : December 28, 2021
INVENTOR(S) : Mazzocchia et al.

It is certified that error appears in the above-identified patent and that said Letters Patent is hereby corrected as shown below:

On the Title Page

Item (87):
"PCT Pub. No.: WO2016/109661; PCT Pub. Date: Jun. 21, 2016"
Should read:
--PCT Pub. No.: WO2018/109661; PCT Pub. Date: Jun. 21, 2018--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*